Nov. 2, 1937.　　　　H. M. CORSE　　　　2,098,178
FUEL CONTROL SYSTEM
Filed May 29, 1933　　　9 Sheets-Sheet 1

Inventor
Herbert M. Corse
By Geo. P. Kimmel
Attorney

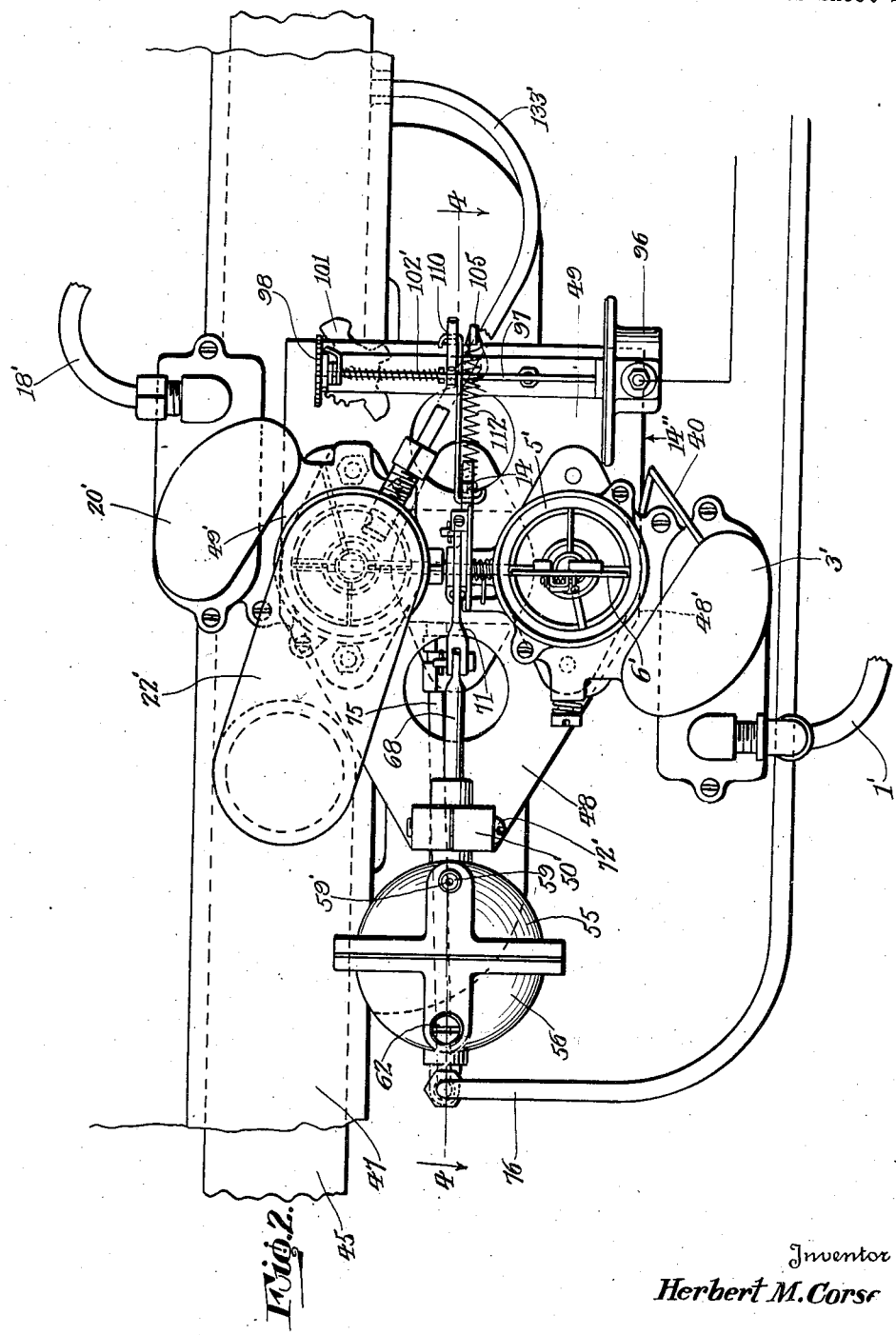

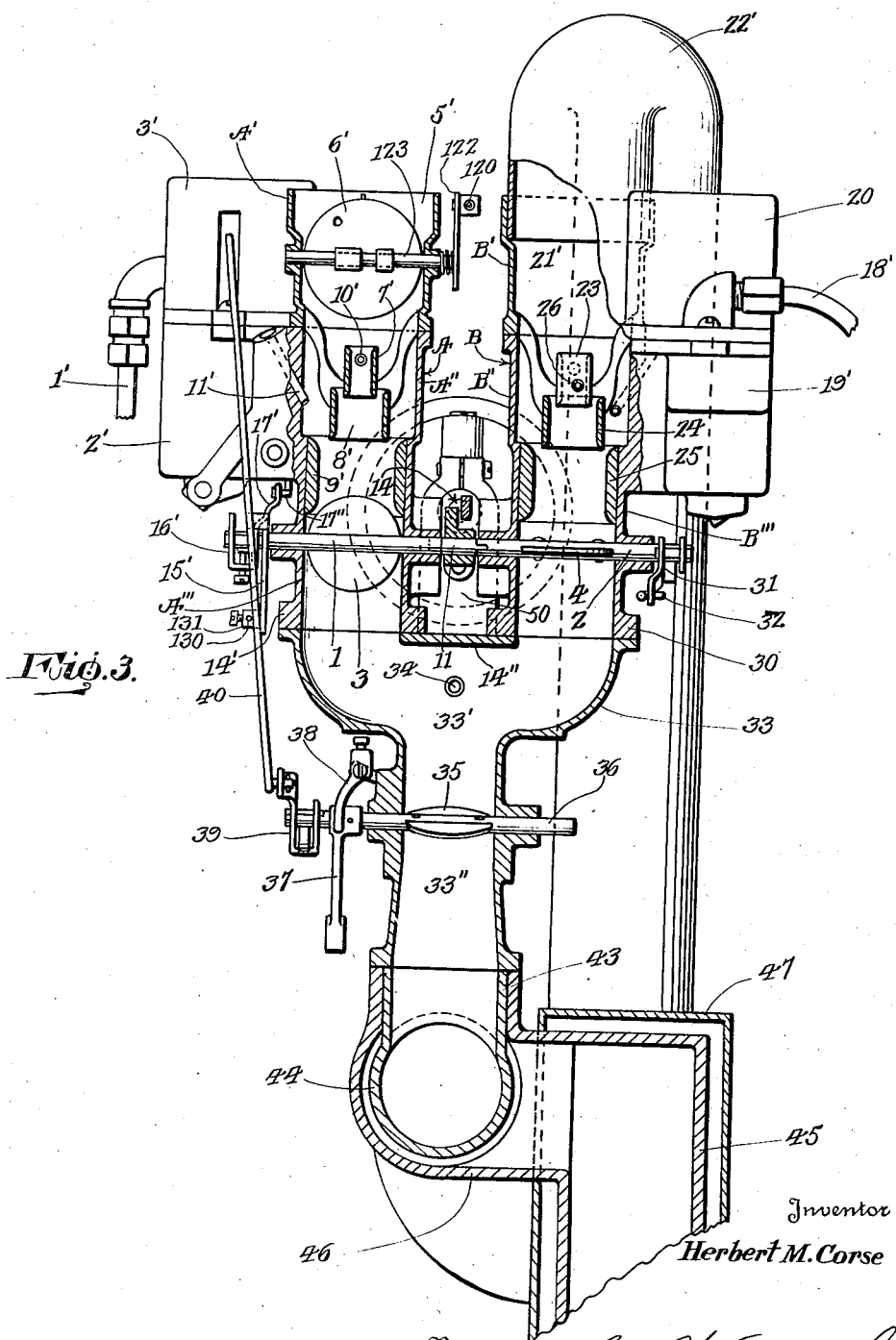

Nov. 2, 1937.  H. M. CORSE  2,098,178
FUEL CONTROL SYSTEM
Filed May 29, 1933   9 Sheets-Sheet 4
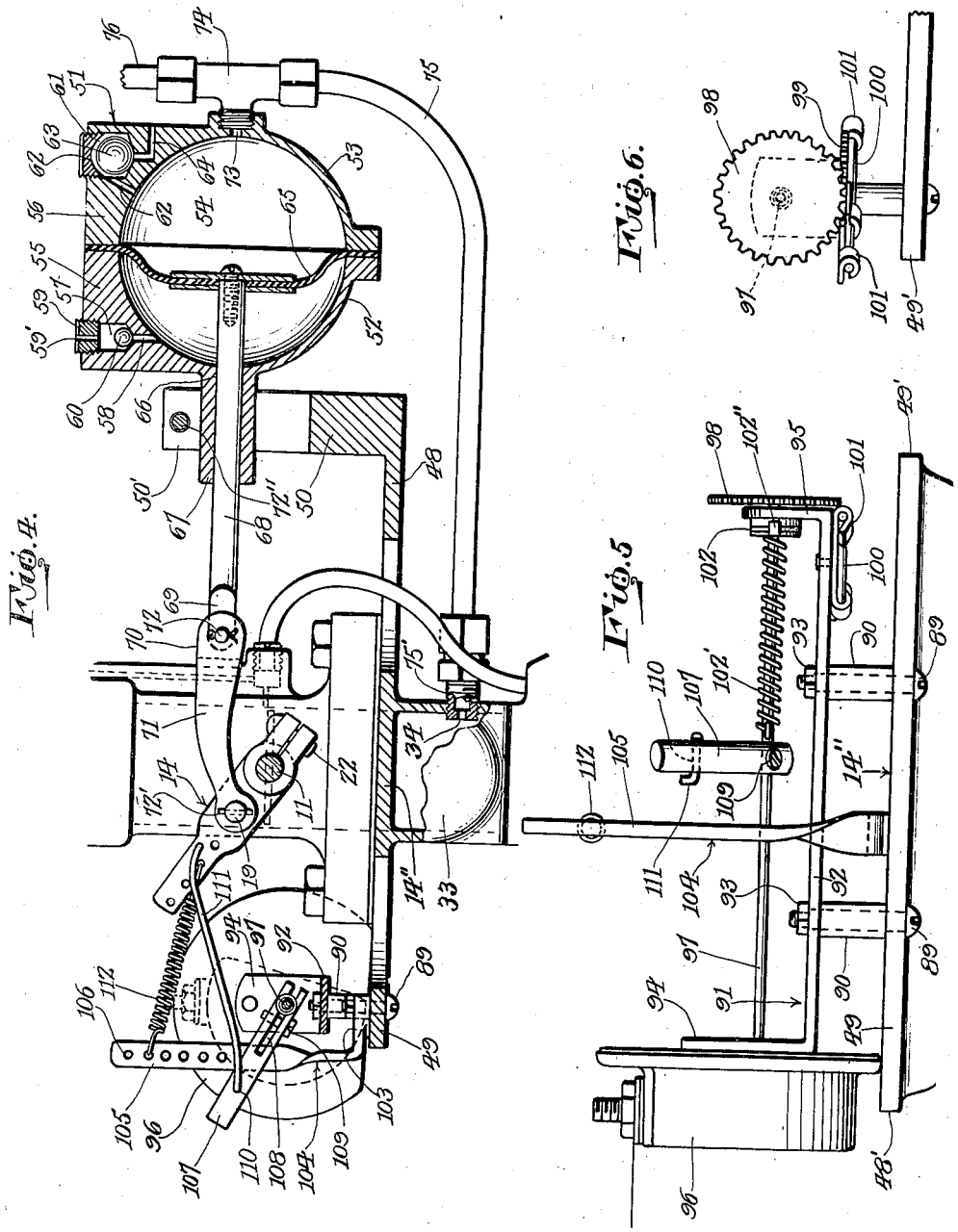
Inventor
Herbert M. Corse
By Geo. P. Kimmel
Attorney

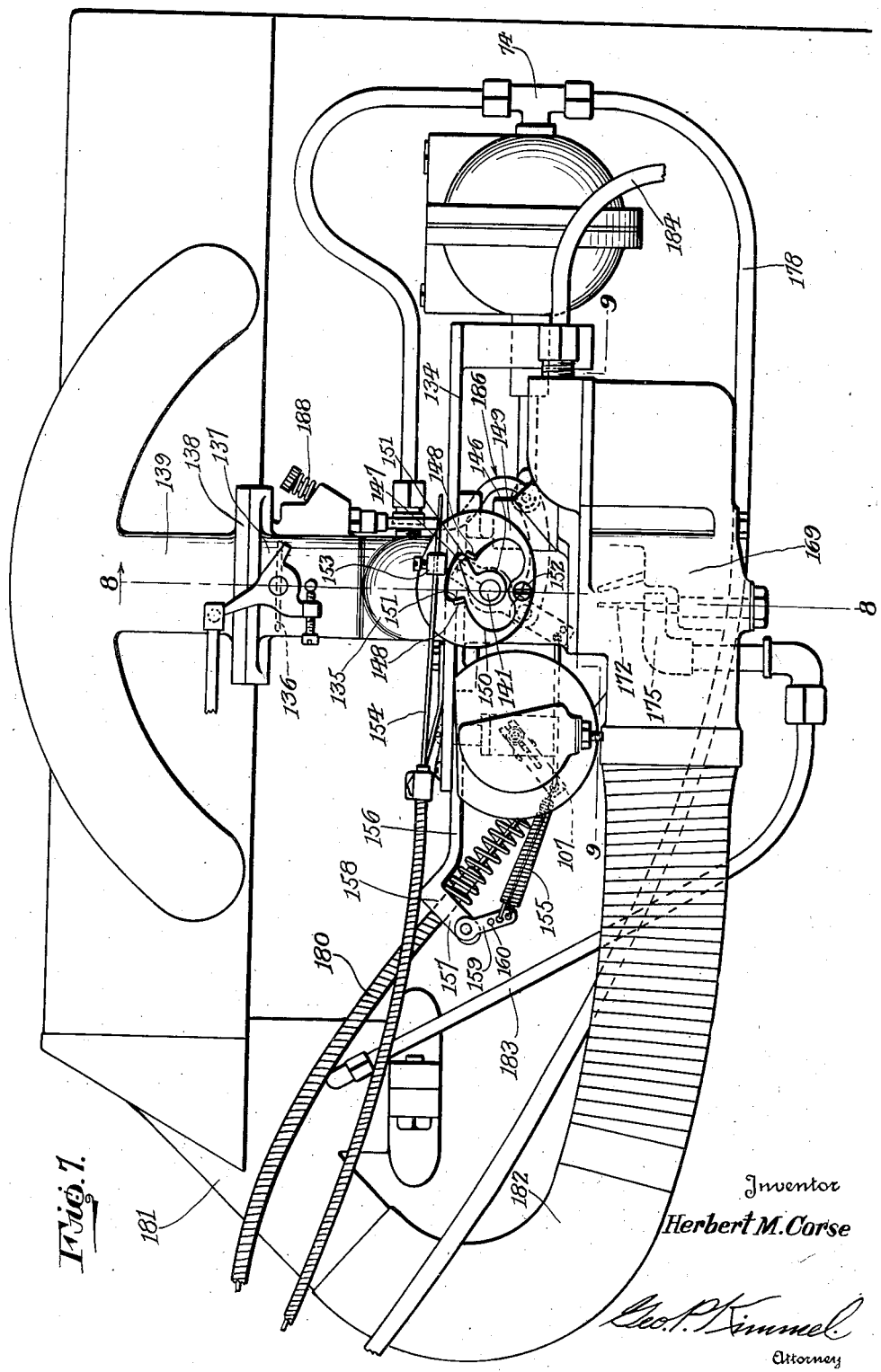

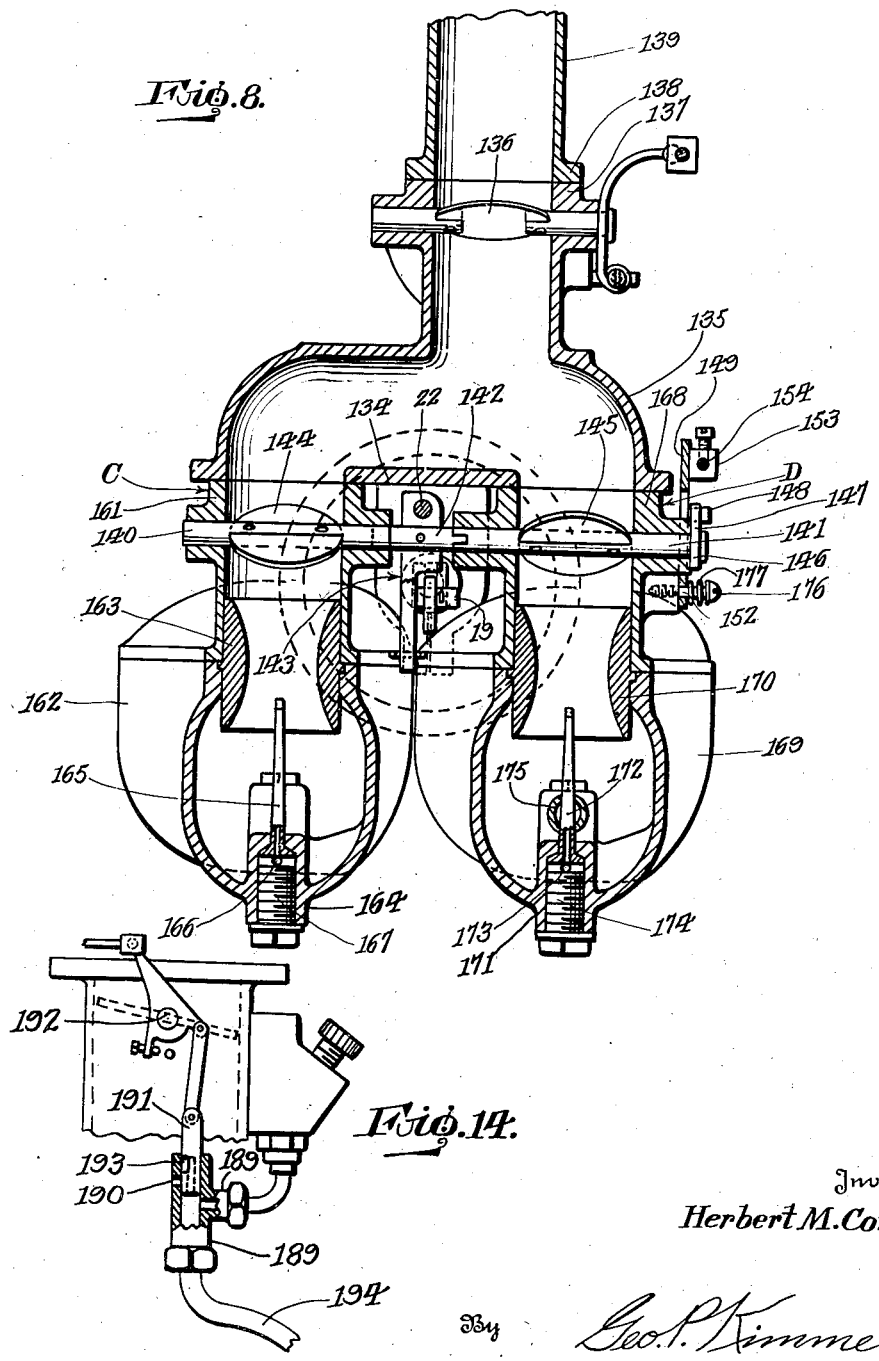

Nov. 2, 1937.    H. M. CORSE    2,098,178
FUEL CONTROL SYSTEM
Filed May 29, 1933    9 Sheets—Sheet 7

Inventor
Herbert M. Corse
By Geo. P. Kimmel
Attorney

Nov. 2, 1937.                H. M. CORSE                2,098,178
                          FUEL CONTROL SYSTEM
                          Filed May 29, 1933                9 Sheets-Sheet 8
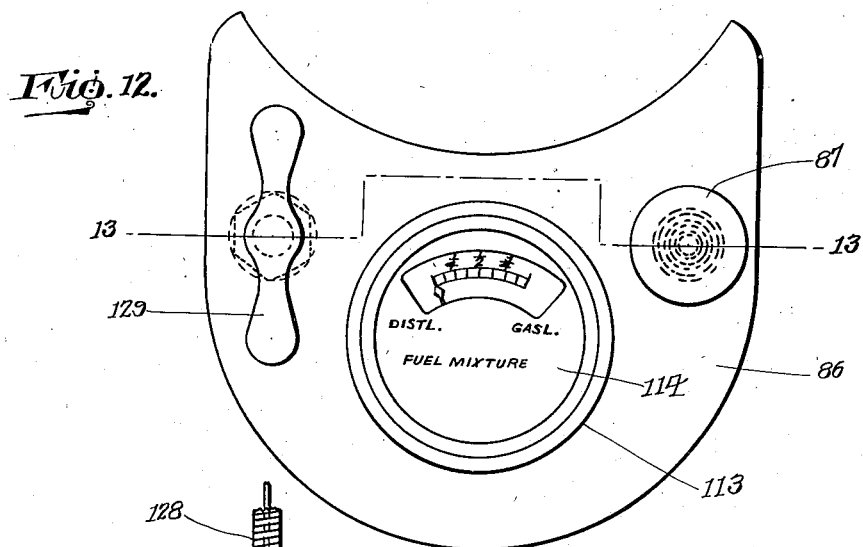
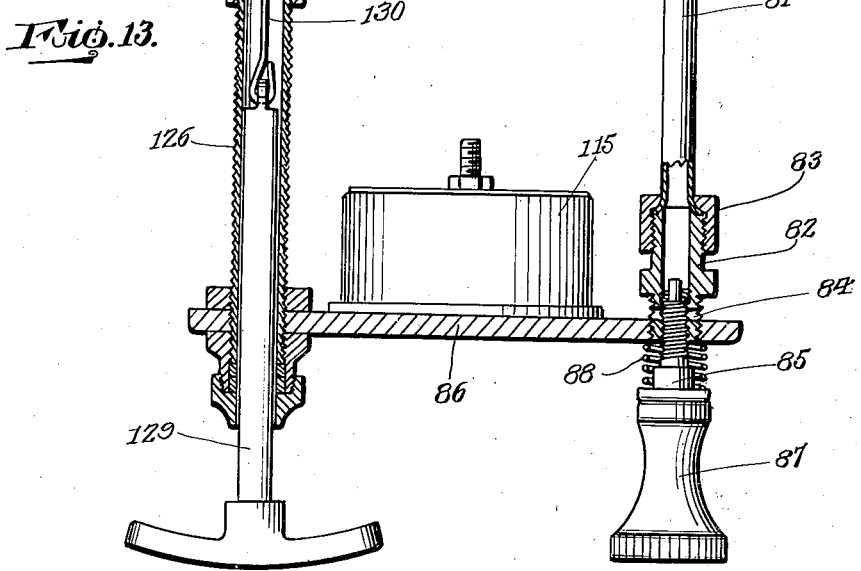
Inventor
Herbert M. Corse
By Geo. P. Kimmel
Attorney

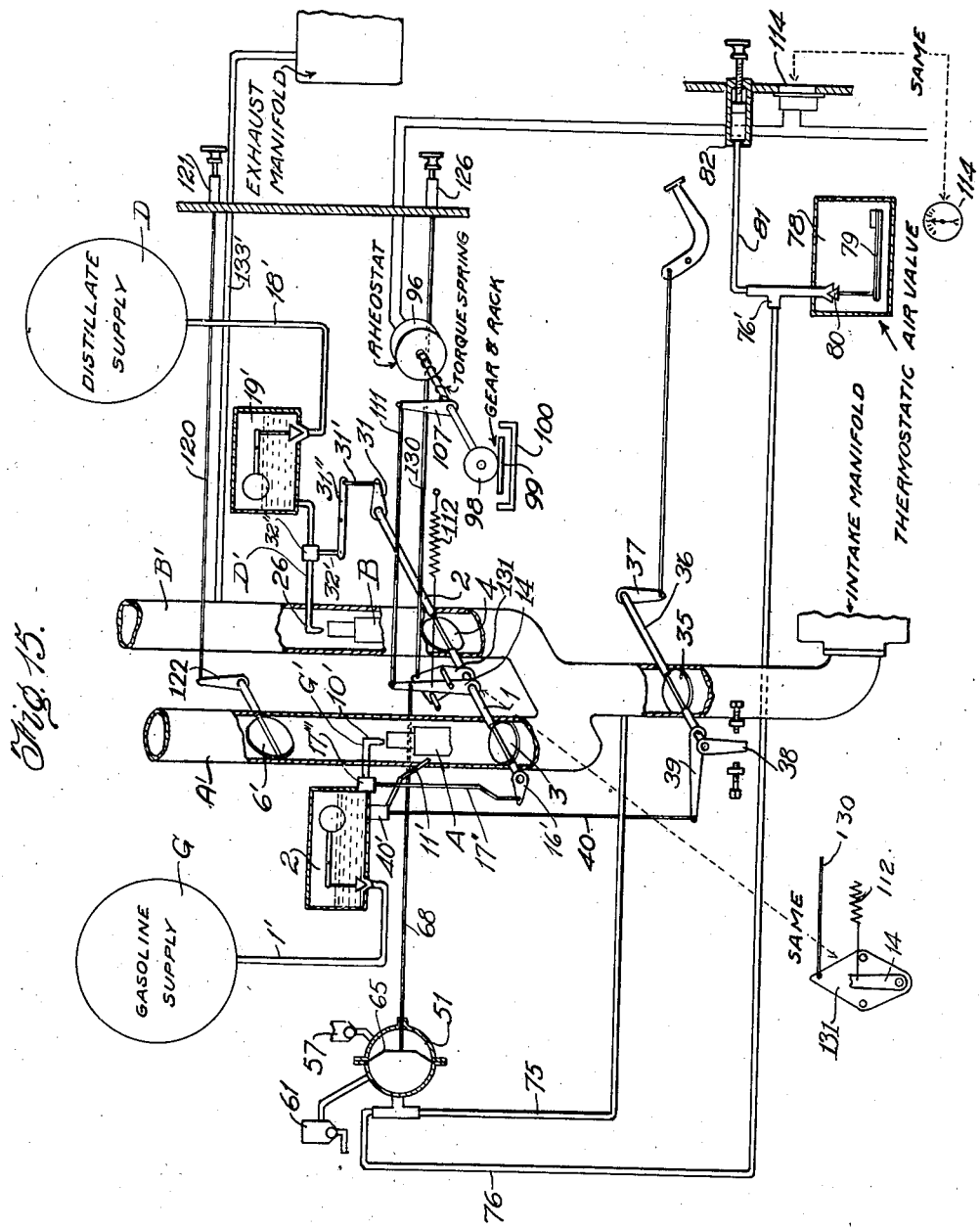

Patented Nov. 2, 1937

2,098,178

UNITED STATES PATENT OFFICE 2,098,178

FUEL CONTROL SYSTEM

Herbert M. Corse, near Green Cove Springs, Fla.

Application May 29, 1933, Serial No. 673,520

28 Claims. (Cl. 123—127)

This invention relates to a controlling system for delivering fuels to internal combustion engines, more particularly to an improvement upon the controlling system disclosed in my application, Serial Number 609,297, filed May 4, 1932, which matured into Patent No. 1,944,068, granted January 16, 1934, and which not only embodies the objects and advantages with respect to the system as disclosed in the aforesaid application, but has for its further object to provide, in a manner as hereinafter set forth, a controlling system for the purpose referred to including means actuated from the vacuum or suction of the intake of the engine for delivering to the combustion chamber of the latter fuels in such a manner as to permit of automatic variations of the proportions in which the fuels are mixed as the duty of the engine may demand or permit; means for limiting the range of such automatic variations of the proportions of the fuels; means for manually varying the proportions of the fuels, and means for indicating to the operator the character of the fuel mixture supplied to the engine.

It has long been known in the art of internal combustion engines designed and constructed primarily to operate on low boiling liquid fuels such as gasoline, that the vacuum or suction in the intake manifold between the intake valves and the throttle valve is high when the engine is operating with nearly closed throttle and decreases as the throttle is opened.

I have discovered that the suction, low with nearly closed throttle and increasing as the throttle is opened and the speed and load of the engine increases and the reverse that exists in the intake passage between the throttle and the restricter or venturi in a carbureter while the engine is running provides a satisfactory means of actuating a mechanism for varying the proportions in which fuels are mixed and to this end the invention aims to provide, in a manner as hereinafter set forth, a thoroughly efficient means for carrying out a fuel control for the purpose referred to.

To the above ends essentially and to others which may hereinafter appear, the invention consists of such parts and such combination of parts which fall within the scope of the invention as claimed.

It will be readily understood that my novel system is not dependent upon any one mechanical arrangement or construction designed to serve as means for operating the system. My invention comprises any means which may provide for the control of the proportions in which the plurality of fuels is supplied to the combustion chamber of the engine; also means for doing this while at the same time permitting the variation of these proportions to be controlled by the operator; also means for doing this by manual control only. In order to more fully describe my novel system which is my invention, I shall give one or more illustrations of how it may be practiced, but it will be understood that changes, variations and modifications may be resorted to which fall within the scope of this invention as claimed.

In the drawings:

Figure 2 is a top plan view of the fuel controlling means shown in Figure 1.

Figure 3 is a section on line 3—3 Figure 1.

Figure 4 is a section on line 4—4 Figure 2.

Figure 5 is a fragmentary view in elevation showing a rheostat and its operating mechanism.

Figure 6 is a detail of the rheostat operating mechanism.

Figure 7 is a fragmentary view in side elevation of an internal combustion engine showing the adaptation therewith of a fuel controlling means, in accordance with this invention for updraft operation.

Figure 8 is a section on line 8—8 Figure 7.

Figure 12 is a front elevation showing the indicator and control ends respectively of the air tube and manual shifting means for the shafts of the butterfly valves.

Figure 13 is a section on line 13—13 Figure 12.

Figure 14 is a sectional elevation showing a controlling attachment for the idling orifice, and Figure 15 is a diagrammatic view of the form of the apparatus shown in Figures 1 to 6.

Figure 1:
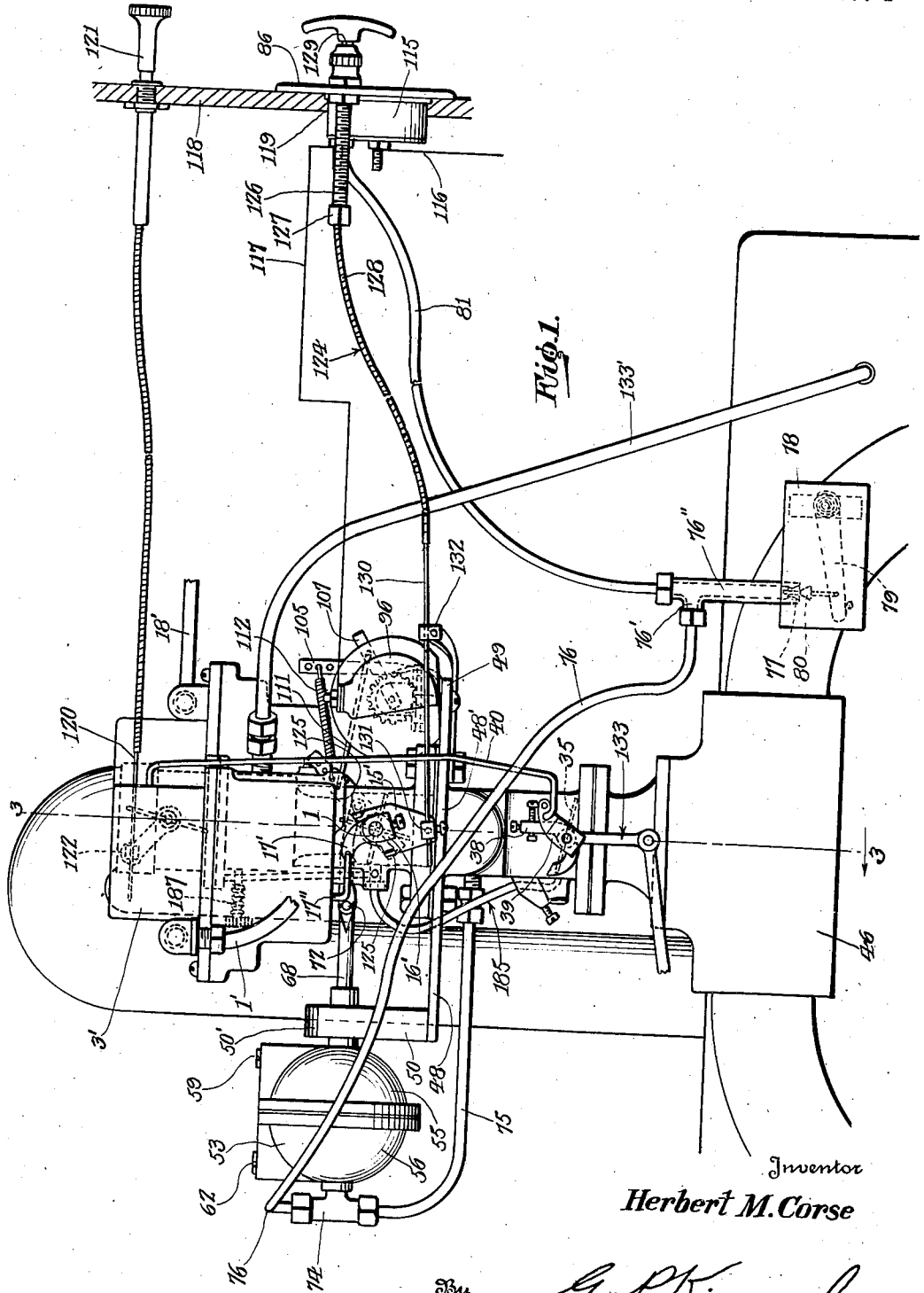
Figure 1 is a fragmentary view in side elevation of an internal combustion engine showing the adaptation therewith of a fuel controlling means, in accordance with this invention for downdraft operation.

In both forms shown, a fuel regulating valve mechanism is used and such mechanisms are of like form. The purpose of the mechanism is to regulate the proportionate flow of gasoline fuel and air mixture and the proportionate flow of distillate fuel and air mixture. An example of this mechanism is more clearly shown in Figures 10 and 11 and includes a pair of shafts 1, 2 provided with butterfly valves 3, 4 respectively. The shafts 1, 2 are lengthwise slotted, as at 5, 6 respectively. The slots extend in opposite directions with respect to each other. The valve 3 extends through slot 5 and is fixed to shaft 1 by the holdfast devices 7. The valve 4 extends through slot 6 and is fixed to shaft 2 by the holdfast means 8. The shafts 1, 2 are disposed at the diametrical centers of the valves 3, 4 respectively. The slots dispose the valves at nearly right angles to each other so that when one valve is wide open the other is fully closed. The shafts 1, 2 endwise align, but are spaced from each other. The inner ends of the shafts 1, 2 are formed with the furcations 9, 10 respectively which are disposed at right angles to each other. Interposed between the shafts 1, 2 is a shiftable shaft 11 for bodily moving the shafts 1, 2 in unison. The shaft 11 has its ends formed with diametrically arranged tongues 12, 13 disposed at an angle to each other and engaging in the furcations 9, 10 respectively for coupling shafts 1, 2 and 11 together. Fixedly secured to shaft 11 is a shifting lever 14 therefor and which consists of a lower part 15, an upper part 16 of less width than part 15, a split collar 17 integral with the latter, parallel apertured ears 18 extended from the collar 17, an apertured lug 19 integral with part 15 disposed in spaced relation to the collar 17, a pair of openings 20 at the point of joinder of parts 15, 16, a row of spaced openings 21 disposed lengthwise of part 16 and holdfast means 22 extending through the ears 18 for clamping collar 17 to shaft 11. The holdfast means 22 is shown in Figures 4 and 8. When the regulating valve mechanism is employed in connection with a downdraft operation, the lever 14 extends upwardly from shaft 11, see Figure 4. When used in connection with an updraft operation, lever 14 depends from shaft 11. The valve 3 is employed to regulate the proportionate flow of gasoline fuel and air and the valve 4 to regulate the proportionate flow of distillate fuel and air mixture.

Figure 10:
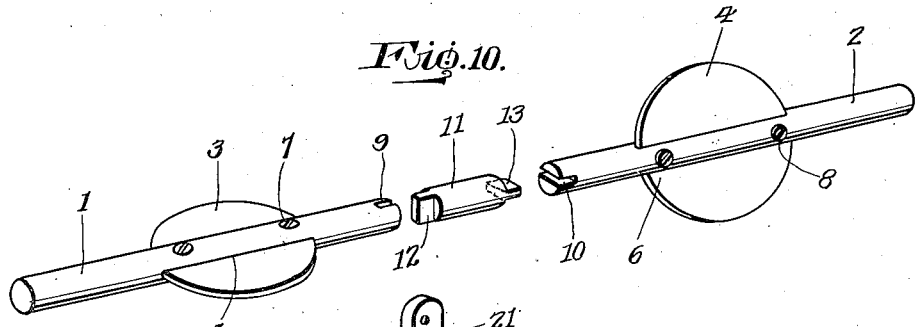
Figure 10 is a disassembled view in perspective of the butterfly valves, their shafts and the coupling shaft between the shafts for the valves.
Figure 11:
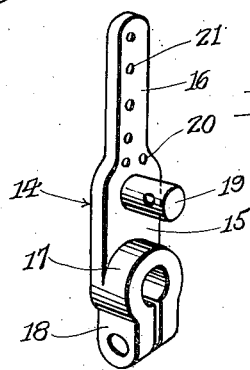
Figure 11 is a perspective view of the lever for shifting the coupling shaft.

I sometimes prefer to leave out the two butterfly valves and shafts shown in Figure 10 and use one cylinder valve (not shown) placed in the junction of the three passages in the manifold plate and actuated by a mechanism similar to that shown in Figure 4.

I desire to point out that the difference between a liquid and a gaseous fuel is simply a question of the temperature and pressure under which the substance regarded as a fuel may be at the time it is considered. All fuels whose chemical composition is not materially altered by changes in temperature and pressure may be, at least theoretically, presented as solid, liquid or gas if the proper temperature and pressure is made to obtain. My novel system, therefore, comprises all phases in which a fuel may be used. Throughout this application, wherever the term "liquid fuel" is used, the gaseous or solid phase, under suitable conditions, is meant to be comprised in this term. My invention does not depend upon the chemical composition nor upon the phase of any fuel used. My invention is likewise to be understood to comprise any plurality of fuels. For the purpose of clear explanation, the discussion, examples and illustrations set forth in this specification deal with two liquid fuels, but as explained hereinabove, my novel system is not limited to such, but comprises fuels in any phase and any plurality. For the purposes of this application, the term "fuel" should be interpreted to mean in addition to the above, either one fuel or a plurality of fuels as such, or mixed with air, or inert gases, or any other mixture finally delivered in the combustion chamber, as the context may require.

I desire also to point out that in the operation of any internal combustion engine the fuel must be so mixed or supplied with air as to cause oxidation to proceed when once initiated by causing the proper temperature to obtain. This mixing or supplying with air may be done external to the cylinder or in the cylinder itself which then serves as a mixing chamber. When the term "mixing chamber" is used in the description and claims, it is meant to comprise both cases. In addition to the mixing of the fuels with air, or oxygen, when a plurality of fuels is used, it is usually desirable to mix the fuels with each other at some stage prior to the initiation of combustion, as well as to mix the combined fuels with air. The fuels may be mixed and then the mixture mixed with air, or each may be mixed separately with air and then the air mixtures combined, or one may be mixed with a surplus of air and this air mixture mixed with another fuel. When in the description and claims, the terms "mix", "mixing", or "mixture" are used they should be interpreted as the context may require in the light of this explanation.

When in the description and claims, the boiling point of a fuel is referred to, it should be borne in mind that hydrocarbon fuels ordinarily used in the operation of internal combustion engines are often mixtures of two or more substances, each with a definite boiling point at normal atmospheric pressure, and that properly speaking, the mixture has no boiling point. However, a certain fraction, or certain fractions usually predominate to the extent of classifying the fuel as low boiling or high boiling, these terms, and the term "boiling point", wherever used herein, should be interpreted as the context may require in the light of this explanation.

As an example of low boiling point or easily combustible fuel, gasoline is mentioned, and as an example of a high boiling point fuel distillate is mentioned, but other petroleum base fuels, such as ether or kerosene may be used, as well as fuels of different sources, such as picric acid and alcohol.

Referring to Figures 1 to 6 of the drawings, a fuel controlling means for downdraft operation is shown. The system is used in connection with any suitable form of carbureting devices, and the number of the latter will depend upon the number of different fuels employed. By way of example, the system is shown for use in connection with two fuels and two carbureting devices. There is illustrated a pair of vertical carbureters A, B, the former for gasoline and the latter for distillate. The carbureters A, B as shown by way of example are in the form of tubular structures each comprising an upper, an intermediate and a lower portion. The upper, intermediate and lower portions of carbureter A are indicated at A′, A″ and A‴ respectively and those of carbureter B at B′, B″ and B‴ respectively. Each of said structures is open at each end thereof. The carbureters are arranged in parallel spaced relation. The lower portion of each of said structures is of smaller inner diameter than the remaining portions thereof.

With respect to carbureter A, a connection 1′ leads from a gasoline supply, G (Figure 15), to fill a constant level float valve controlled gasoline container 2' arranged adjacent the upper and lower portions of the carburetor and which functions for a constant level supply of gasoline fuel to discharge jets. A dust cover 3' is used for the gasoline pump and a metering rod mechanism, not shown. The pump is shown in dotted lines Figure 1 and indicated at 40' in Figure 15.

The upper portion A' of carbureter A provides an air horn or air intake 5' and arranged within the latter is a choke valve 6' for the purpose of enriching gasoline fuel air ratio at starting.

Arranged within portion A'' is a primary Venturi tube 7' and a secondary Venturi tube 8', the former being of less inner diameter than and arranged concentric to the latter. The lower end of tube 7' extends into the upper end of tube 8'. Arranged within the upper part of the portion a''' is a main Venturi tube 9' of greater inner diameter than tube 8'. The latter is concentrically disposed with respect to and has its lower end extend into the upper end of tube 9'. The tubes are for the purpose to regulate the gasoline fuel air ratio. Extending into the tube 7' is a main jet or nozzle 10' employed for discharging gasoline fuel into the air supply. Projecting into portion A'' adjacent the tube 8' is a pump discharge jet 11' to enrich fuel air ratio as the throttle is opened. The accelerator pump may be arranged to draw its supply from the float chamber 2' or may be arranged to draw from a separate reservoir containing an extra high power fuel.

The shaft 1 extends diametrically of the portion A''', as well as extending outwardly from the latter. The valve 3 carried by shaft 1 is arranged in portion A''', and the latter is formed with extended bearings for shaft 1. The lower end of portion A''' is flanged as at 14' for connection to a manifold plate 14''. Loosely mounted on the outer end of shaft 1 is a normally stationary plate 15' for a purpose to be referred to. Fixed to the outer end of shaft 1 is a lever 16' with an arm 17' to operate a link 17'' which in turn operates a pin, not shown, in a metering jet 17''' (Figure 15) arranged in the gasoline supply passage G' leading to nozzle or jet 10'.

With respect to carbureter B, a connection 18' leads from a distillate supply D (Figure 15) to fill a constant level float valve controlled distillate fuel container 19' arranged adjacent the portions B', B'' and which functions for a constant level supply of distillate fuel to discharge jets. A dust cover 20' is provided for distillate rocker arm assembly, not shown.

The upper portion B' of carbureter B provides an air horn or air intake 21' and into which opens a hot air conducting pipe 22'. Arranged within portion B'' is a primary Venturi tube 23 and a secondary Venturi tube 24. The former is of less inner diameter than and is arranged concentric to the latter. The lower end of tube 23 extends into the upper end of tube 24. Arranged within the upper part of portion B''' is a main Venturi tube 25 of greater inner diameter than tube 24. The latter is concentrically disposed with respect to and has its lower end extend into the upper end of tube 25. The tubes are for the purpose to regulate distillate fuel air ratio. Extending into the tube 23 is the main jet or nozzle 26 to discharge distillate fuel into air supply.

The shaft 2 extends diametrically of portion B''' as well as extending outwardly from the latter. The valve 4 carried by shaft 2 is arranged in portion B''', and the latter is formed with extended bearings for shaft 2. The lower end of portion B''' is flanged as at 30 for connection to manifold plate 14''. Fixed to the outer end of shaft 2 is a lever 31 with an arm 32 (Figure 3) to operate a link 31' which in turn operates a rocker arm 31' (Figure 15) for shifting a link 32' which operates a metering pin, not shown, arranged in a metering jet 32'' positioned in a distillate supply passage D' leading to the nozzle or jet 26.

A throttle valve housing 33 common to carbureters A and B is employed. The housing includes an enlarged hollow flared part providing a chamber 33' and a reduced tubular part forming a conducting passage 33'' which opens into the intake 43 of the intake manifold 44 of the engine. The manifold plate 14'' forms a part of the housing 33. The lower portions A''' and B''' are not only secured to plate 14'' but also to the enlarged part of housing 33 and open into chamber 33'. The wall of chamber 33' is provided with a restricted orifice 34 for a purpose to be referred to.

Arranged within the passage 33'' is a throttle valve 35 of the butterfly type to regulate flow of the proportioned gasoline and distillate fuel and air mixtures. The valve 35 is carried by a shaft 36 journaled transversely of the reduced part of housing 33. The shaft 36 has connected thereto a lever arm 37 for turning it. Associated with shaft 36 is an adjustable device 38 for regulating low speed of the engine. Carried by shaft 36 is a lever 39 for actuating a link 40 which is adapted to operate the gasoline pump (not shown) with movement of throttle.

The exhaust manifold of the engine is indicated at 45 and includes an extension 46 which encompasses in spaced relation the intake 43 of the manifold 44 and constitutes a heating jacket. Arranged over the exhaust pipe of the engine is a hood 47 to collect hot air. The hot air conducting pipe 22' opens into the hood 47.

The manifold plate 14'', Figures 2 and 4, is extended forwardly and rearwardly from the housing 33 as at 48, 49 respectively and from the sides of housing 33, as at 48', 49'. The plate 14'' constitutes a platform. The forwardly projecting portion 48 of plate 14'' is tapered and at its outer end is provided with a post 50 having an apertured split upper portion 50'.

Suspended forwardly of and supported by post 50 is a housing 51 formed of a pair of oppositely disposed sections 52, 53 of like form and shaped to provide a spherical diaphragm chamber 54. The sections 52, 53 have enlarged upper parts 55, 56 respectively. The part 55 is formed with a check valve chamber 57, a port 58 leading from chamber 54 to chamber 57, a removable ported plug 59 forming the top wall of chamber 57 and having its port 59' leading from the latter to the atmosphere, and a check valve 60 within chamber 57 for normally closing port 58 to chamber 57. The part 56 is provided with a check valve chamber 61, a port 62 leading from chamber 54 to chamber 61, a removable non-ported plug 62 forming the top wall of chamber 61, a check valve 63 within the latter, and a port 64 leading from chamber 61 to the atmosphere. The valve 63 normally closes port 64 to chamber 61.

The chamber 54 (Figure 4) is divided by a cup-shaped diaphragm 65 into a front and a rear compartment closed to each other. The port 58 opens into the rear one of said compartments and port 62 into the front one. The diaphragm 65 has its marginal portion anchored between the inner sides of the sections 52, 53. The section 52 at its axis is apertured as at 66. Formed integral with section 52 is a rearwardly disposed tubular member 67 which registers with the opening 66. Slidably mounted in the member 67 and extending into the rear compartment of the chamber 54 as well as having one end anchored to and axially of diaphragm 65 is a stem 68 which projects rearwardly from member 67. The rear end 69 of stem 68 is reduced for passage into the forked forward end 70 of a rearwardly extending link 71 having its rear portion curving downwardly. The ends 69 and 70 are pivotally connected together as at 72. The rear end of link 71 is apertured and pivotally mounted on lug 19 of lever 14. A pin 72' extends through lug 19 for retaining link 71 thereon. The member 67 extends through the split apertured upper portion 50' of post 50 and is clamped thereto by holdfast means 72 binding the walls of the split in the post against each other and member 67.

The section 53 has axially thereof an air port 73 which opens into the forward compartment of chamber 54. A T-coupling 74 is attached to section 53 and has one leg thereof open into port 73. Another leg of coupling 74 has attached thereto a tube 75 carrying a coupling 75' which is attached to housing 33 with orifice 34. Coupled to the remaining leg of coupling 74 (Figures 1 and 4) is a flexible air tube 76 which opens into a tubular offset 76' provided in proximity to the upper end of a vertically disposed tubular member 76'' having its lower end formed with a valve seat 77.

The member 76'' extends into the housing 78 of a thermostatic controlled air inlet valve mechanism 79. The valve 80 of said mechanism is adapted to engage seat 77 of member 76'' to shut off intake of air thereto. The mechanism 79 is an auxiliary part that may or may not be used. When not employed, the tube 76 continues direct into tube 81. Extending from the upper end of member 76'' is an air conducting tube 81 (Figures 1, 12 and 13) which is connected to the inner end of a rigid tube 82 by an inwardly flanged collar 83. The tube 82 is formed intermediate its ends with air intakes 84 which are controlled and regulated through the means of a manually adjusted regulator element or valve 85 which threadedly engages with the inner face of the outer portion of tube 82. The latter is fixedly secured to and extends inwardly from one side of an instrument plate 86. The element 85 extends rearwardly from the plate 86 and includes a handle 87. Interposed between the latter and plate 86, as well as surrounding element 85 is a coiled controlling spring 88. The air intakes 84 are arranged in close proximity to the forward face of plate 86.

The rear and front compartments provided by the diaphragm dividing chamber 54 constitute what may be termed a dash pot chamber and a suction chamber. The valve 60 is light and restricts the flow of air into the dash pot chamber, but allows air to flow out freely. The valve 63 is heavy. The stem 68 slides freely through member 67 with a nearly air tight fit therewith. The lever 14 is provided for transmitting motion of the stem 68 to the shaft 11 to provide for the simultaneous shifting of the shafts 1, 2 to adjust valves 3, 4.

The rear part 49 of plate 14'' has extending upwardly therethrough a pair of spaced parallel headed bolts 89 (Figures 4 and 5). Seated upon part 49 and encompassing the bolts 89 are sleeves 90 providing a pair of supports. The bolts 89 extend beyond the upper ends of sleeves 90. Mounted on the latter is a U-shaped bracket 91 disposed transversely of part 49. The bolts 89 extend through and above the base 92 of bracket 91 and carry clamping nuts 93 which bind against the upper face of said base whereby the bracket 91 is anchored stationary. The arms of bracket 92 are designated 94, 95 and the former is of greater length than the latter. Opposing the outer side of arm 94 and seating on part 49 is a rheostat 96. Journaled in the arms 94, 95 and extended from the latter is a shaft 97 for operating the rheostat 96. One end of shaft 97 is operatively connected to the rheostat 96 and its other end has fixed thereto a gear 98 for operating a segment 99 (Figure 6) on a limiting lever arm 100. The latter is pivotally supported by base 92 and arranged in the path of oppositely disposed spaced stops 101. The arm 95 carries on its inner face a bearing 102 for one end of shaft 97. Surrounding the latter, fixed at one end to shaft 97 and engaging with bearing 102 is a spring controlled drag 102' for said shaft. In order to permit free motion for the rheostat 97, the arm 102'' of the drag 102' is released from seating in bearing 1.

Fixed at its lower end to the part 49 of plate 14'' is the horizontal arm 103 of an angle-shaped member 104. The vertical arm of the latter indicated at 105, is of greater length than arm 103 and torsionally twisted in proximity to arm 103 whereby the sides of arm 105 above the twisted portion of the latter will be disposed in the same manner as the sides of the arms 94, 95. That part of arm 105 above the twisted portion is formed with a row of spaced openings 106 for a purpose to be referred to.

The shaft 97 is operated by a crank arm 107 formed with a furcation 108 (Figure 4) in its lower portion through which extends shaft 97. The furcation 108 provides for adjustably mounting the crank arm on the shaft. Holdfast means 109 extends through the arm 107 for securing it to the shaft. The arm 107 in proximity to its outer end is formed with a diametrically extending opening 110.

Selectively engaging in one of the openings in the shifting lever 14 is a link 111 which also extends from through the opening 110 in arm 107 for the purpose of connecting the latter to lever 14 whereby on the shift of the latter, arm 107 will be moved therewith to turn shaft 97. A controlling spring 112 is employed for pulling the lever 14, link 111, stem 68 and diaphragm 65 against the suction of the vacuum chamber. The spring 112 has one end attached to lever 14 and its other end selectively engaging in the opening 106. The openings 106 are provided for adjusting the tension of spring 112.

The plate 86 is formed with an opening 113 to make visible the indicating face 114 of an electrically operated indicator 115 which is attached to the forward face of plate 86. Circuit connections 116, 117 are provided for the rheostat 96 and indicator 115. The latter indicates the relative proportion being used of two fuels, such as distillate and gasoline. In Figure 12 the needle of the indicator is at the left hand end of the scale thereby indicating that the device is operating on all distillate and no gasoline. When the needle is at the one-quarter point on the scale it indicates that the device is operating on a proportion of one-quarter of gasoline and three-quarters of distillate, and so on. When the needle is at the right end of the scale it indicates that the device is operating on all gasoline and no distillate.

The plate 86 is carried by the instrument board 118. The latter has an opening 119 through which indicator 115 extends. An operating means for the choke valve 6' is indicated at 120. The said means extends through the instrument board 118 and carries at its rear end a pull handle 121 (Figure 1). The forward end of the means 120 is connected to a crank 122 on the choke valve shaft 123.

A manual adjusting means 124 (Figures 1 and 12) is provided for the fuel regulating valve mechanism which is connected to the lower end of plate 15', the latter being formed with a pair of spaced stops 125 (Figure 1) for limiting the movement of the regulating or proportioning valves 3, 4 when shifted by the actuation of lever 14. The stops 125 coact with the lever 16' for actuating the shift of valves 3 and 4 when they are moved by the manually adjusting means. The means 124 includes a sleeve 126 which extends through the plate 86. Attached to the forward end of sleeve 126, as at 127 is a flexible tubing 128 of less diameter than the sleeve. Extending into the rear end of sleeve 126 is a slidable handle member 129 connected to a flexible pull member 130. The latter projects beyond the tubing 128 and is adjustably connected as at 131 to plate 15' (Figure 1). The member 130 passes through a guide 132 extended rearwardly from part 49 of plate 14".

The throttle valve 35 is operated in a known manner by conventional means indicated at 133. A pipe 133' is provided for conducting exhaust gases from the engine to the part B" of carbureter B.

Figure 9:
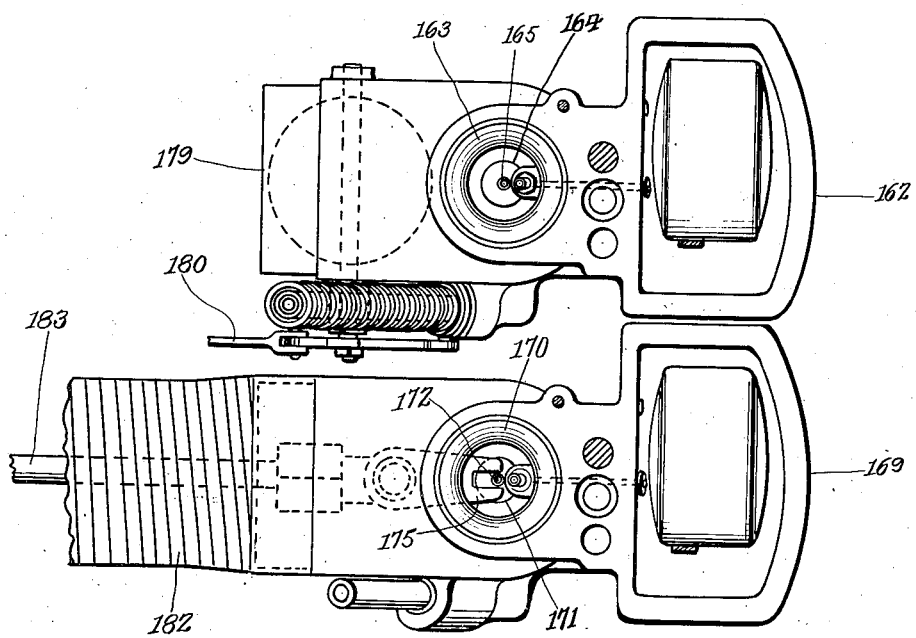
Figure 9 is a section on line 9—9 Figure 7.

Referring to Figures 7, 8 and 9 the adaptation of a fuel controlling means, in accordance with this invention is illustrated in connection with an updraft operating carbureting structure. The latter includes a pair of parallel spaced carbureters C and D connected at their upper ends to a manifold plate 134 corresponding to the plates 14". Attached to plate 134 and into which opens the upper ends of the carbureters C, D is a throttle valve housing 135 substantially of the same form and arranged reversely to that of housing 33. Positioned in the upper portion of housing 135 is a throttle valve 136. The upper end of housing 135 is flanged, as at 137 for connection to a flange 138 at the lower end of intake manifold 139. The carbureter C is employed for gasoline fuel and D for distillate fuel.

In Figure 8 the shafts corresponding to shafts 1, 2 and 11 are indicated at 140, 141 and 142 respectively. The lever corresponding to lever 14 is designated 143 but its position is reversed relative to that of lever 14. The valves corresponding to valves 3, 4 are designated 144, 145 respectively. The plate 15' and elements 16' and 17' referred to in connection with the downdraft type are not employed with the updraft type. The shaft 140 has eccentrically mounted on its outer end a collar 146 (Figure 7) formed with an arm 147 capable of engaging stops 148 extending in spaced relation from the upper portion of a pivoted disc 149 formed with an eccentrically arranged irregular shaped opening 150. The stops 148 extend from opposed wall portions 151 of opening 150. The disc 149 is pivotally connected at its bottom, as at 152 to the carbureter C. The outer face of the disc 149 at the upper part thereof is provided with an adjustable coupling means 153 for a pull member 154 corresponding to pull member 130.

In the form shown in connection with updraft operation, the arrangement of spring anchor is different from that shown in connection with downdraft operation. One or two springs may be used depending on the strength of the springs used and the tension desired. In Figure 7 there is shown two springs 155.

In the form shown in Figures 7, 8 and 9, the element 104 employed in connection with the downdraft is not used, but the elements 89 to 102" are however. The elements 89 to 102" when used for updraft operation have their positions reversed with respect to the arrangement of such elements shown in Figures 4 and 5. That is to say, they depend from the plate 134 in lieu of extending upwardly therefrom.

The element 104 is employed to anchor one end of the pulling spring 112, but there is substituted for such element 104 in the updraft form, a rearwardly extending hanger 156 having an angularly disposed arm 157 (Figure 7) provided with an opening 158 for a purpose to be referred to. Fixed to arm 157 is a depending member 159 having spaced openings 160 for selectively anchoring the other ends of the pulling springs 155. The hanger 156 extends from plate 134.

The body of carbureter C includes a tubular upper part 161 and in the upper portion of the latter is journaled shaft 140 carrying valve 144. A float valve controlled constant level gasoline container is indicated at 162 (Figure 8). Arranged within and depending from the lower end of part 161 is a Venturi tube 163 for regulating air flow. Positioned within the lower part 164 of carbureter C is a main jet or nozzle 165 for discharging gasoline into air flowing through tube 163. A passage leading from container 162 to jet or nozzle 165 is indicated at 166. A removable plug 167 is employed to enable the cleaning out of jet 165 and passage 166.

The body of carbureter D includes a tubular upper part 168 and in the upper portion of the latter is journaled shaft 141 carrying valve 145. A float valve controlled constant level distillate container is indicated at 169 (Figure 8). Arranged within and depending from the lower end of part 168 is a Venturi tube 170 for regulating of air flow. Positioned within the lower part 171 of carbureter D is a main jet or nozzle 172 for discharging distillate into air flowing through tube 170. A passage leading from container 169 to jet or nozzle 172 is indicated at 173. A removable plug 174 is employed to enable the cleaning out of jet 172 and passage 173.

The exhaust gas heater 175 is employed for heating the distillate in jet 172, container 169 and for an admixture of exhaust gas into air flow through carbureter D. The pivot 152 includes a head 176. A coiled spring 177 is mounted on pivot 152 and is interposed between head 176 and disc 150, the latter being loosely mounted on pivot 152.

In the updraft form, the thermostatic controlled air intake valve 80 and separate air tubes or lines 76, 81 are not employed, but in lieu thereof a single air tube 176 is used and which is attached at one end to that leg to which line or hose 81 is connected. The line or tube 178 leads from the T-coupling to the plate 86. That end portion of line 178 which is attached to plate 86 is of the same form and arrangement as that end portion of line or hose 81 which is attached to said plate.

Carburetor C is provided with a choke valve 179 operated from a spring controlled pull mechanism 180 which passes through opening 158 (Figure 7) in arm 157. Leading from a hot air confining hood 181 on the discharge pipe of the engine to the carburetor D is a hot air conductor 182. An exhaust gas conduit 183 (Figure 7) opens into the heater 175. A distillate supply line is designated 184.

Otherwise than that as stated with respect to Figures 7, 8 and 9, the construction thereof will be the same as that shown with respect to Figures 1 to 6.

In both forms, there is employed an idling orifice or jet in close proximity to the throttle valve. Such orifice is for communication with the gasoline carburetor. In Figure 1 the idling orifice and its connections with the gasoline carbureter are generally indicated at 185 and in Figure 7 at 186. The connections are controllable as indicated at 187 Figure 1 and 188 Figure 7.

I sometimes prefer to place a T-connection 189, Figure 14, with a branch thereof ported, as at 190 to the atmosphere. The port 190 is controlled by a hollow plunger 191 operated by the motion of the throttle shaft 192. The plunger 191 functions so that the supply of fuel through the idling orifice is completely suspended as soon as the throttle is opened beyond the lower speed positions. The plunger 191 is ported as at 193 for communication with port 190. The structure referred to is for the purpose of preventing a small amount of gasoline passing through the idling orifice when the proportioning valves are in the all distillate position. The plunger 191 functions also to close the idling orifice to the tube 194 to gasoline supply.

The indicator 114 is of a form to indicate to the operator the proportions of the fuels supplied to the engine. The tubes 76, 81 provide a suction line. The tube 178 provides a suction line.

Operation: Before starting the engine in a cold condition, the handle 129 of the flexible wire control is pulled to place to the plate 15' or disc 149, each providing a limiting element in position to hold the fuel regulating or proportioning valves in all gasoline position; the engine may then be started in the usual manner. After the engine is under load and warming up, the limiting element may be moved part way and the valve adjusted on the end of the tube to the suction line so that the diaphragm slowly pulls the stem 68 and shifting lever 14 or 143 overcoming the opposing pull of the return tension spring, as shown by the movement of the pointer of the indicator.

When the engine has warmed up to operating temperature and the intake manifold reaches a temperature near the boiling point of water due largely to the heat transmitted through contact with the exhaust manifold or exhaust jacket around part of the intake manifold, the handle 129 may be moved further allowing the shifting mechanism to move full stroke when the engine is under working load.

As the throttle valve is opened and the engine increases in speed and load, the suction in the manifold plate passage increases and this suction acts through the orifice and tube to the diaphragm in the vacuum and actuating mechanism. The size of the orifice regulates the strength of the effective suction on the diaphragm. This effective suction is limited by the ball check valve and also regulated by adjusting the bleed valve. The amount of opening of this valve regulates how soon the shifting mechanism begins to operate. The tension and angle at which the tension spring is mounted also affects this.

The movement of the diaphragm and stem is retarded in one direction by restricting the inflow of air into the dash pot on the stem side of the diaphragm. Air leaking slowly around the stem permits the diaphragm to pull the stem into the diaphragm chamber quite slowly when the suction on the diaphragm is reduced, as when the engine is slowed down, the air in the stem side of the diaphragm chamber escapes readily through the light ball check and the diaphragm and stem have free motion in this direction being pulled by the tension spring.

The effect of this is to rapidly change the proportion of fuel to more gasoline on deceleration and to slowly increase the proportion of heavier fuel on acceleration thus giving good engine performance.

When the throttle is closed to idling position, the fuel supply is almost entirely through the idling jet and this is always an all gasoline and air mixture.

When the limiting element is in full range position and the air bleed valve is adjusted so that the shifting mechanism just reaches the all distillate position at normal speed and load, as in a motor vehicle traveling on fairly level road, then when the engine is slowed down with open throttle as in hill climbing, the proportion of gasoline fuel is automatically increased and the proportion of distillate decreased until the engine is operating on all gasoline before it is slowed to stalling by the heavy load.

Whenever full gasoline operation of the engine is desired this may quickly and conveniently be obtained by moving flexible wire control handle 129 to a position when the limiting element holds the valve shafts in a position when the main butterfly valve in the gasoline chamber is wide open and the main valve in the distillate heater is fully closed. Or the degree of closing of the gasoline valve may be limited to a minimum by the position of the limiting element.

The construction and arrangement of the elements of the system relative to each other provides for the controlling of the proportioning mechanism by the depression existing between the venturi means of the carbureters and a throttle valve 35 or 136.

If it is desired in case of emergency as when there is danger of exhausting the supply of gasoline, the limiting element may be held in a position where the engine operates on all distillate fuel or nearly so at all speeds above idling speed. The engine may be operated on all distillate when the gasoline supply is entirely exhausted as long as a fair speed and load is maintained.

On heavily loaded engines it is sometimes desirable to open the valve 80 at nearly wide open position of the throttle valve by a link from lever 79 to a lever on the throttle valve shaft (not shown), so that the fuel position proportion is automatically made part or all gasoline at wide open throttle irrespective of the speed and temperature of the engine. This function may be combined with the thermostatic valve as described, or introduced as a separate valve in either tube 25 or 26.

What I claim is:—

1. In a fuel control system for internal combustion engines using more than one fuel, carbureters including Venturi means, a throttle means, proportioning mechanism controlled by the depression between said Venturi means and the said throttle means for varying the proportions of the fuels supplied to the combustion chamber of the engine, and means for retarding the change in proportions as the engine throttle is opened.

2. In a fuel control system for internal combustion engines using more than one fuel, a proportioning mechanism for automatically varying the proportions of the fuels supplied to the combustion chamber of the engine, and fuel proportion indicating means operated from said proportioning mechanism.

3. In a fuel control system for internal combustion engines using a plurality of different fuels, carbureters including Venturi means, a throttle means, fuel supplies, a proportioning mechanism controlled by the depression existing between said Venturi means and throttle means and including means for slowly and automatically varying the proportions of the fuels supplied to the combustion chamber of the engine, and means for limiting the minimum amount of one of the fuels.

4. In a fuel control system for internal combustion engines using a plurality of different fuels, carbureters including Venturi means, a throttle means, fuel supplies, a proportioning mechanism controlled by the depression existing between said Venturi means and throttle means and including means for slowly and automatically varying the proportions of the fuels supplied to the combustion chamber of the engine, and means for limiting the minimum amount and the maximum amount of one of the fuels.

5. In a fuel control system for internal combustion engines using a plurality of different fuels, carbureters including Venturi means, a throttle means, fuel supplies, a proportioning mechanism controlled by the depression existing between said Venturi means and throttle means and including means for slowly and automatically varying the proportions of the fuels supplied to the combustion chamber of the engine, and means for supplying an extra quantity of one of the fuels as the said throttle means is opened.

6. In a fuel control system for internal combustion engines using a plurality of fuels of different boiling points, a proportioning mechanism for automatically and simultaneously varying the proportions of the fuels supplied to the combustion chamber of the engine, means for limiting the minimum proportion of the fuel of lowest boiling point, means for limiting the maximum proportion of the fuel of lowest boiling point, and means for supplying a limited amount of fuel of low boiling point as the engine throttle is opened.

7. In a fuel control system for internal combustion engines using more than one fuel, a proportioning mechanism for slowly and automatically varying the proportions of the fuels supplied to the combustion chamber of the engine, and means for automatically increasing the proportion of the fuel of low boiling point when the engine is slowed with open throttle by heavy load.

8. In a fuel control system for internal combustion engines using more than one fuel, the combination with a pair of carbureters, one for fuel of low boiling point and the other for fuel of high boiling point, and a throttle valve common to said carbureters, of a manually and automatically operable fuel proportioning mechanism for delivering fuels in a manner to permit of automatic variations of the proportions in which the fuels are mixed as the duty of the engine may demand, said mechanism being common to said carbureters, means for manually operating said mechanism while the engine is in normal operation, and means operated from the suction of the engine for automatically operating said mechanism to automatically vary the proportions of the fuels supplied through said carbureters to the combustion chamber of the engine.

9. In a fuel control system for internal combustion engines using more than one fuel, the combination with a pair of carbureters, one for fuel of low boiling point and the other for fuel of high boiling point, and a throttle valve common to said carbureters, of a manually and automatically operable fuel proportioning mechanism for delivering fuels in a manner to permit of automatic variations of the proportions in which the fuels are mixed as the duty of the engine may demand, said mechanism being common to said carbureters, means for manually operating said mechanism while the engine is in normal operation, means for automatically operating said mechanism to automatically vary the proportions of the fuels supplied through said carbureters to the combustion chamber of the engine, and means for retarding the change in proportions as the throttle valve is opened.

10. In a fuel control system for internal combustion engines using a plurality of fuels of different boiling points, the combination of carbureters, each for a different fuel, and a throttle valve common to said carbureters, of a manually and automatically operated fuel proportioning mechanism for delivering fuels in a manner to permit of automatic variations of the proportions in which the fuels are mixed as the duty of the engine may demand, said mechanism being common to said carbureters, means for manually operating said mechanism while the engine is in normal operation, means for automatically operating said mechanism to automatically vary the proportions of the fuels supplied through said carbureters to the combustion chamber of the engine, and means for supplying exhaust gases discharged from the engine to that carbureter for the fuel of high boiling point.

11. In a fuel control system for internal combustion engines using a plurality of fuels of different boiling points, the combination with carbureters, each for a different fuel, and a throttle valve common to said carbureters, of a manually and automatically operable fuel proportioning mechanism for delivering fuels in a manner to permit of automatic variations of the proportions in which the fuels are mixed as the duty of the engine may demand, said mechanisms being common to said carbureters, means for manually operating said mechanism, means operated from the suction of the engine for automatically operating said mechanism to automatically vary the proportions of the fuels supplied through said carbureters to the combustion chamber of the engine, means for retarding the change in proportions as the throttle is opened, and means for supplying exhaust gases discharged from the engine to that carbureter for the fuel of high boiling point.

12. In a fuel control system for internal combustion engines using fuels of different boiling points, the combination with a pair of carbureters, one for fuel of low boiling point and the other for fuel of high boiling point, and a throttle valve common to said carbureters, of a fuel proportioning mechanism for delivering fuels in a manner to permit of automatic variations of the proportions in which the fuels are mixed as the duty of the engine may demand, said mechanism being common to said carbureters and located adjacent said valve, means operated from the suction of the engine for automatically operating said mechanism to automatically vary the proportions of the fuels supplied from said carbureters to the combustion chamber of the engine, a fuel proportion indicating mechanism operated from the means operated from the suction of the engine, and means for supplying hot air to the carbureter for the fuel of high boiling point.

13. In a fuel control system for internal combustion engines using more than one fuel, the combination with a pair of carbureters, one for fuel of low boiling point and the other for fuel of high boiling point, and a throttle valve common to said carbureters, of a manually and automatically operable fuel proportioning mechanism for delivering fuels in a manner to permit of automatic variations of the proportions in which the fuels are mixed as the duty of the engine may demand, said mechanism being common to said carbureters, means for manually operating said mechanism, means operated from the suction of the engine for automatically operating said mechanism to automatically vary the proportions of the fuels supplied through said carbureters to the combustion chamber of the engine during the operation of the latter, means for supplying exhaust gases discharged from the engine to that carbureter for the fuel of high boiling point, and means for supplying hot air to that carbureter for the fuel of high boiling point.

14. In a fuel control system for internal combustion engines using more than one fuel, the combination with a pair of carbureters, one for fuel of low boiling point and the other for fuel of high boiling point, and a throttle valve common to said carbureters, of a manually and automatically operable fuel proportioning mechanism for delivering fuels in a manner to permit of automatic variations of the proportions in which the fuels are mixed as the duty of the engine may demand, said mechanism being common to said carbureters, means for manually operating said mechanism, means operated from the suction of the engine for automatically operating said mechanism to automatically vary the proportions of the fuels supplied through said carbureters to the combustion chamber of the engine during the operation of the latter, means for retarding the change in proportion as the throttle is opened, means for supplying exhaust gases discharged from the engine to that carbureter for the fuel of high boiling point, and means for supplying hot air to that carbureter for the fuel of high boiling point.

15. In a fuel control system for internal combustion engines using more than one fuel, the combination with carbureters, each for a different fuel, a throttle valve common to said carbureters, and a choke valve controlled air intake, of a fuel proportioning mechanism for delivering fuels in a manner to permit of automatic variations of the proportions in which the fuels are mixed as the duty of the engine may demand, common to said carbureters, adjustable, controllable, manually operated means for operating said mechanism, an adjustable, controllable means for automatically operating said mechanism to automatically vary the proportions of the fuels supplied through said carbureters to the combustion chamber, and means for supplying exhaust gases discharged from the engine to heat one of the fuels 16. In a fuel control system for internal combustion engines using more than one fuel, the combination with carbureters, each for a fuel of a different boiling point, a throttle valve common to said carbureters, and a choke valve controlled air intake, of a fuel proportioning mechanism for delivering fuels in a manner to permit of automatic variations of the proportions in which the fuels are mixed as the duty of the engine may demand, common to said carbureters, adjustable, controllable, manually operated means for operating said mechanism, an adjustable, controllable means for automatically operating said mechanism to automatically vary the proportions of the fuels supplied through said carbureters to the combustion chamber of the engine, means for supplying exhaust gases discharged from the engine to heat one of the fuels, and means for supplying hot air to heat the fuel heated from the exhaust gases.

17. In a fuel control system for internal combustion engines using more than one fuel, carbureters including Venturi means and each for a different fuel, fuel supplies, a throttle valve, a proportioning mechanism controlled by the depression existing between the Venturi means and the throttle valve for automatically varying the proportions of the fuels supplied to the combustion chamber of the engine, said mechanism including means to provide for rapidly changing the proportion of the lighter fuel on deceleration and to slowly increase the proportion of the heavier fuel on acceleration.

18. In a fuel control system for internal combustion engines using more than one fuel carbureters including Venturi means and each for a different fuel, fuel supplies, a throttle valve, a fuel proportioning mechanism controlled by the depression existing between the Venturi means and the throttle valve and operated from the suction of the engine where the suction varies with the speed and load of the engine for automatically varying the proportions of the fuels supplied to the combustion chamber of the engine, said mechanism including means to provide for rapidly changing the proportion of the lighter fuel on deceleration and to slowly increase the proportion of the heavier fuel on acceleration.

19. In a fuel control system for internal combustion engines using a plurality of fuels of different boiling points, a suction controlled proportioning mechanism for automatically, slowly and simultaneously varying the proportions of the fuels supplied to the combustion chamber of the engine, means for limiting the minimum proportion of the fuel of lowest boiling point, means for limiting the maximum proportion of the fuel of lowest boiling, and means for supplying a limited amount of fuel of low boiling point as the engine throttle is opened.

20. In a fuel control system for internal combustion engines using more than one fuel, a suction controlled proportioning mechanism operated from the suction of the engine for automatically and simultaneously varying the proportions of the fuels supplied to the combustion chamber of the engine, said mechanism including means to provide for rapidly changing the proportion of the lighter fuel on deceleration and to slowly increase the proportion of the heavier fuel on acceleration.

21. In a fuel control system for internal combustion engines using more than one fuel, carbureters, each for a different fuel and each including Venturi means, fuel supplies, a throttle valve, and a fuel proportioning mechanism controlled by the depression existing between the Venturi means and throttle valve for slowly, automatically and simultaneously varying the proportions of the fuels supplied to the combustion chamber of the engine.

22. In a fuel controlled system for internal combustion engines using more than one fuel, carbureters, each for a different fuel and each including Venturi means, fuel supplies, a throttle valve, and a fuel proportioning mechanism controlled by the depression existing between said Venturi means and throttle valve as the manifold suction varies counter to the speed and load of the engine for slowly, automatically and simultaneously varying the proportions of the fuels supplied to the combustion chamber of the engine.

23. In a fuel control system for internal combustion engines using more than one fuel, carbureters, each for a different fuel and each including a Venturi means, a throttle valve, fuel supplies, and a fuel proportioning mechanism including a flexible diaphragm controlled by the depression existing between the Venturi means and the throttle valve for automatically and slowly varying the proportions of the fuels supplied to the combustion chamber of the engine.

24. In a fuel control system for internal combustion engines using more than one fuel, fuel supplies, carbureters, each for a different fuel and each including a Venturi means, a throttle valve, and a fuel proportioning mechanism controlled by the depression existing between the Venturi means and the throttle valve and including means for automatically and simultaneously providing a gradual retarded suction action on the fuels to slowly vary the proportions of the fuels supplied to the combustion chamber of the engine, and means for retarding the change in proportions as said throttle valve is opened.

25. In a fuel control system for internal combustion engines using more than one fuel, fuel supplies, carbureters, each for a different fuel and each including a Venturi means, a throttle valve, and a fuel proportioning mechanism controlled by the depression existing between the Venturi means and the throttle valve and including means for automatically and simultaneously providing a gradual retarded suction action on the fuels to slowly vary the proportions of the fuels supplied to the combustion chamber of the engine.

26. In a fuel control system for internal combustion engines using more than one fuel, fuel supplies, carbureters, each for a different fuel and each including a Venturi means, a throttle valve, a fuel proportioning mechanism controlled by the depression existing between the Venturi means and throttle valve for slowly, automatically and simultaneously varying the proportions of the main supply fuels supplied to the combustion chamber of the engine, means to allow the engine to idle on a fuel of lower boiling point, and means for suspending the supply of fuel of lower boiling point through the said other means when the engine is operating at high speed.

27. In a fuel control system for internal combustion engines using a plurality of fuels of different boiling points, the combination with carbureters, each including a Venturi means and each for a different fuel, fuel supplies and a throttle valve common to said carbureters, of a proportioning mechanism controlled by the depression existing between said Venturi means and the throttle valve for delivering fuels in a manner to permit of automatic variations of the proportions in which the fuels are mixed as the duty of the engine may demand, said mechanism being common to the carbureters and located adjacent to said valve, means for automatically operating said mechanism to automatically vary the proportions of the fuels supplied from said carbureters to the combustion chamber of the engine, and means for supplying hot air to that carbureter for the fuel of high boiling point.

28. In a fuel control system for internal combustion engines using more than one fuel, the combination with carbureters, each for a different fuel and including a Venturi means, fuel supplies, a throttle valve common to said carbureters, and a choke valve controlled air intake, of a fuel proportioning mechanism controlled by the depression existing between the Venturi means and throttle valve and common to said carbureters, an adjustable, controllable manually operated means for operating said mechanism, and an adjustable, controllable means operated from the suction of the engine to automatically vary the proportions of the fuels supplied through said carbureters to the combustion chamber of the engine.

HERBERT M. CORSE.